US008677481B1

(12) United States Patent
Lee

(10) Patent No.: US 8,677,481 B1
(45) Date of Patent: Mar. 18, 2014

(54) VERIFICATION OF WEB PAGE INTEGRITY

(75) Inventor: Andrew Lee, Mt. View, CA (US)

(73) Assignee: Trend Micro Incorporated, Tokyo (JP)

( * ) Notice: Subject to any disclaimer, the term of this patent is extended or adjusted under 35 U.S.C. 154(b) by 847 days.

(21) Appl. No.: 12/242,557

(22) Filed: Sep. 30, 2008

(51) Int. Cl.
*H04L 29/06* (2006.01)

(52) U.S. Cl.
USPC .............................................. 726/22; 726/26

(58) Field of Classification Search
None
See application file for complete search history.

(56) References Cited

U.S. PATENT DOCUMENTS

| | | | |
|---|---|---|---|
| 6,271,840 B1 | 8/2001 | Finseth et al. | |
| 6,393,591 B1 | 5/2002 | Jenkins, IV et al. | |
| 6,510,458 B1 | 1/2003 | Berstis et al. | |
| 6,760,884 B1 | 7/2004 | Vertelney et al. | |
| 6,785,732 B1 | 8/2004 | Bates et al. | |
| 7,070,103 B2 | 7/2006 | Melick et al. | |
| 7,118,040 B2 | 10/2006 | Melick et al. | |
| 7,236,966 B1 | 6/2007 | Jackson et al. | |
| 7,313,691 B2 * | 12/2007 | Bantz et al. | 713/155 |
| 7,496,960 B1 * | 2/2009 | Chen et al. | 726/22 |
| 7,543,055 B2 * | 6/2009 | Kohn | 709/224 |
| 7,562,304 B2 * | 7/2009 | Dixon et al. | 715/738 |
| 7,681,234 B2 * | 3/2010 | Florencio et al. | 726/22 |
| 7,765,481 B2 * | 7/2010 | Dixon et al. | 715/738 |
| 7,818,343 B1 * | 10/2010 | Sekhar et al. | 707/781 |
| 7,822,620 B2 * | 10/2010 | Dixon et al. | 705/1.1 |
| 7,930,299 B2 * | 4/2011 | Yuval et al. | 707/722 |
| 7,945,563 B2 * | 5/2011 | Seitz | 707/722 |
| 7,966,553 B2 * | 6/2011 | Iverson | 715/205 |
| 7,971,245 B2 * | 6/2011 | Lalonde et al. | 726/22 |
| 8,015,606 B1 * | 9/2011 | Jevans et al. | 726/22 |
| 8,381,294 B2 * | 2/2013 | Jevans et al. | 726/22 |
| 2003/0051154 A1 * | 3/2003 | Barton et al. | 713/201 |
| 2003/0097591 A1 * | 5/2003 | Pham et al. | 713/201 |
| 2003/0145197 A1 * | 7/2003 | Lee et al. | 713/155 |
| 2004/0148281 A1 * | 7/2004 | Bates et al. | 707/3 |
| 2004/0187023 A1 * | 9/2004 | Alagna et al. | 713/200 |
| 2005/0114658 A1 * | 5/2005 | Dye et al. | 713/165 |
| 2006/0253578 A1 * | 11/2006 | Dixon et al. | 709/225 |
| 2007/0039038 A1 * | 2/2007 | Goodman et al. | 726/2 |
| 2007/0250919 A1 * | 10/2007 | Shull et al. | 726/7 |
| 2008/0027866 A1 * | 1/2008 | Halcrow et al. | 705/51 |
| 2008/0033882 A1 * | 2/2008 | Kafkarkou et al. | 705/52 |
| 2008/0034404 A1 * | 2/2008 | Pereira et al. | 726/2 |
| 2008/0155392 A1 * | 6/2008 | Coutts | 715/229 |
| 2009/0037976 A1 * | 2/2009 | Teo et al. | 726/1 |

OTHER PUBLICATIONS

HTTP referer—Wikipedia, the free encyclopedia, Nov. 2007, 2 pgs. [retrieved on Nov. 20, 2007]. Retrieved from the internet<http://en.wikipedia.org/wiki/Referer.

(Continued)

*Primary Examiner* — Michael R Vaughan
(74) *Attorney, Agent, or Firm* — Okamoto & Benedicto LLP

(57) ABSTRACT

Methods and systems for checking for malicious modifications in web pages. A web page may have corresponding portal page and web page verifier. To receive the web page in a client computer, the portal page is provided to the client computer. The portal page allows for checking of the web page for malicious modifications. For example, the portal page may include or download the web page verifier. The web page verifier may check the web page for signs indicative of malicious modifications. The web page itself may be verified by program code included in the web page.

15 Claims, 14 Drawing Sheets

(56) References Cited

OTHER PUBLICATIONS

Another malware pulls an Italian job, TrendLabs/Malware Blog by Trend Micro, Jun. 18, 2007, 8 pgs. [retrieved on Oct. 27, 2007]. Retrieved from the internet<http://blog.trendmicro.com/another-malware-pulls-an-italian-job.

First Line of Defense by TrendLabs, Trend Micro's global Threat research and support organization, Jul. 2007, 2 pgs. [retrieved on Oct. 27, 2007]. Retrieved from the internet,http://newsletters.trendmicro.com/servlet/website/ResponseForm?mgLEVTTA_TATZ_.4 . . . .

IFrame—Wikipedia, the free encyclopedia, Oct. 2007, 2 pgs. [retrieved on Oct. 29, 2007]. Retrieved from the internet<http://en.wikipedia.org/wiki/IFrame.

Software configuration management—Wikipedia, the free encyclopedia, Jul. 2008, 3 pgs. [retrieved on Jul. 16, 2008]. Retrieved from the Internet: http://en.wikipedia.org/wiki/Software_configuration_management.

Tripwire Products, Tripwire software, configuration audit & control for change automation, 2008, 3 sheets. Webpage [online][retrieved on Jul. 16, 2008]. Retrieved from the Internet: http://www.tripwire.com/products/index.cfm.

Philippe Le Hegaret, et al. "What is the Document Object Model?", Apr. 2004, 7 pgs. [retrieved on Jun. 20, 2008]. Retrieved from the Internet: httt://www.w3.org/TR/DOM-Level-3-Core/introduction.html.

Welcome!—The Apache Software Foundation, 2008, 4 sheets. Webpage [online][retrieved on Jul. 18, 2008]. Retrieved from the Internet: http://www.apache.org/.

Charles Reis, et al. "Detecting In-Flight Page Changes with Web Tripwires", Feb. 2008, 5 pgs. [retrieved on Sep. 18, 2008]. Retrieved from the Internet: http://www.cs.washington.edu/research/security/webtripwires.html.

* cited by examiner

VERIFICATION OF WEB PAGE INTEGRITY

BACKGROUND OF THE INVENTION

1. Field of the Invention

The present invention relates generally to computer security, and more particularly but not exclusively to methods and apparatus for checking for malicious changes to web pages.

2. Description of the Background Art

Computer viruses, worms, Trojans, rootkits, and spyware are examples of malicious codes that have plagued computer systems throughout the world. Although there are technical differences between each type of malicious code, malicious codes are also collectively referred to as "viruses." Antivirus products for protecting computers against known viruses are commercially available. Experienced computer users have installed some form of antivirus in their computers and have learned not to open suspicious files to avoid virus infection.

The Internet provides an effective medium not only for sharing information but also, unfortunately, for spreading viruses and perpetrating online fraud. For example, distribution of viruses no longer requires a user to open a file or receive an infected email. A computer may be infected or compromised simply by accessing websites, even those that are known to be legitimate. A legitimate website may be attacked by a cyber criminal (e.g., hacker) and make malicious modifications to its web pages. The malicious modifications may redirect the user to a malicious website to perpetrate a fraudulent scheme (e.g., phishing) or to infect the user's computer with a virus.

SUMMARY

In one embodiment, a web page has corresponding portal page and web page verifier. To receive the web page in a client computer, the portal page is provided to the client computer. The portal page allows for checking of the web page for malicious modifications. For example, the portal page may include or download the web page verifier. The web page verifier may check the web page for signs indicative of malicious modifications. The web page itself may be verified by program code included in the web page.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
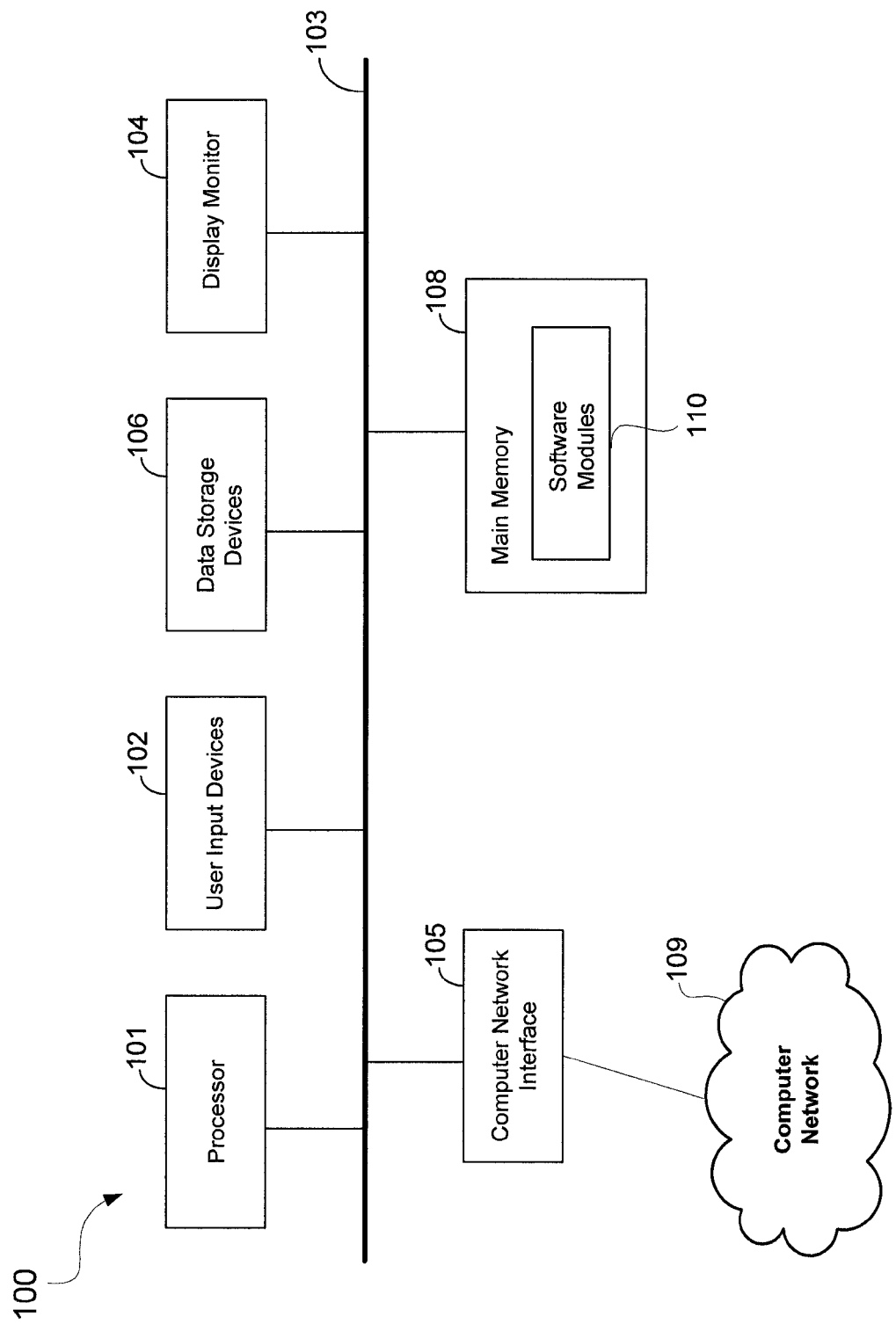
FIG. 1 shows a schematic diagram of a computer in accordance with an embodiment of the present invention.

Referring now to FIG. 1, there is shown a schematic diagram of a computer 100 in accordance with an embodiment of the present invention. Depending on its particular configuration, the computer 100 may be employed as a client or server computer, for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes software modules 110. The software modules 110 may comprise computer-readable program code of computers described in this disclosure. The software modules 110 may be loaded from the data storage device 106 to the main memory 108 for execution by the processor 101.

Figure 2:
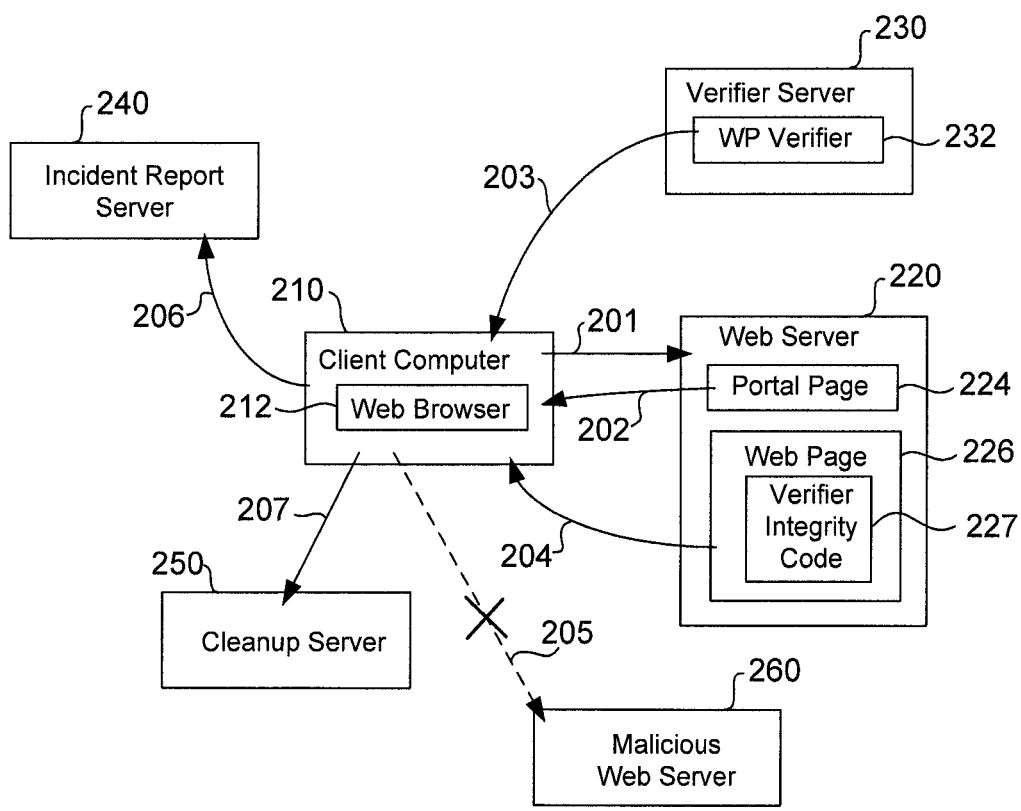
FIG. 2 schematically illustrates a system for checking for malicious modifications to web pages in accordance with an embodiment of the present invention.

FIG. 2 schematically illustrates a system for checking for malicious modifications to web pages in accordance with an embodiment of the present invention. In the example of FIG. 2, the system includes a web server 220 and a verifier server 230. The computers shown in FIG. 2, namely a client computer 210, the web server 220, the verifier server 230, an incident report server 240, a cleanup server 250, and a malicious web server 260 may communicate over the Internet. The servers 220, 230, 240, 250, and 260 may comprise commercially available server computers.

The client computer 210 may comprise a personal computer typically used by an online user to access websites on the Internet. The client computer 210 includes a web browser 212, such as the Microsoft Internet Explorer™ web browser.

The web server 220 may comprise a server computer hosting a website. The website may include a plurality of web pages but only one web page 226 is shown for clarity of illustration. Each web page of the website may have a corresponding portal page 224 and a web page verifier 232. The verifier 232 for the web page 226 is shown as being hosted by the verifier server 230. As will be more apparent below, each web page 226 and corresponding portal page 224 and verifier 232 may also be hosted in the same server computer. The web page 226 is configured such that a client computer 210 receives the portal page 224 before the web page 226.

The web page 226 may include conventional web page content (e.g., written in HTML) plus a verifier integrity code 227. The verifier integrity code 227 may comprise computer-readable program code (e.g., Java script) configured to verify integrity of the web page verifier 232 by checking the web page verifier 232 for unauthorized modifications.

The portal page 224 may comprise a web page that includes computer-readable program code (e.g., Java script) for retrieving the web page verifier 232. In one embodiment, the portal page 224 is configured to download the web page verifier 232 to the client computer that receives the portal page 224, which in this example is the client computer 210.

The web page verifier 232 may comprise computer-readable program code (e.g., Java script) configured to verify integrity of the web page 226 by checking the web page 226 for malicious modifications.

The user of the client computer 210 may employ the web browser 212 to send a request to retrieve the portal page 224 (arrow 201). Note that the actual web page content for user consumption or viewing is in the web page 226. The web page 226 is configured such that it is not readily accessible to users on the Internet. Instead, the client computer 210 first retrieves the portal page 224 from the web server 220 (arrow 202). For example, the web page 226 may have an address that is not publicly known. More specifically, the website hosted by the web server 220 does not have a direct link to the web page 226. The website has the portal page 224 as the main page, only has link to portal pages 224, or both.

Once loaded and running in the client computer 210, the portal page 224 downloads the web page verifier 232 into the client computer 210 (arrow 203). The web page verifier 232 runs upon loading in the client computer 210. The web page verifier 232 downloads the web page 226 into the client computer 210 (arrow 204). In one embodiment, the web page 232 downloads the web page 226 into a security buffer memory so that it is not accessed and displayed by the web browser 212 prior to being checked for malicious modifications. The web page verifier 232 accesses the web page 226 in the security buffer memory to determine if it has been maliciously modified (e.g., changed to redirect users to the malicious web server 260). For example, the web page verifier 232 may check the web page 226 for content not on the web page 226 as originally published on the web server 220 and not made by authorized personnel. Note that merely checking the web page 226 for modifications is not enough as the web page 226 may have been modified to include authorized updates (i.e., by authorized personnel).

In one embodiment, the web page verifier 232 is configured to calculate the integrity value of the web page 226 and compare the calculated integrity value to an expected integrity value of the web page 226. The expected integrity value may be the integrity value of the web page 226 as originally published on the web server 220. The integrity value may be calculated using conventional hashing algorithms, for example. The web page verifier 232 may deem the web page 226 as having been modified if the calculated integrity value does not match its expected integrity value. Integrity value comparison as a first step in checking for malicious modifications advantageously allows for skipping the more compute-intensive scan of the web page 226 for malicious modifications if the integrity values match.

If the web page verifier 232 finds the web page 226 modified, the web page verifier 232 may scan the web page 226 for signs indicative of a malicious modification. For example, the web page verifier 232 may scan HTML (hypertext markup language) tags for patterns likely to be due to malicious modifications based on historical information. The patterns may be in regular expression form. As another example, the web page verifier 232 may scan the web page 226 for IP addresses of known malicious web servers. The web page verifier 232 may also look for inconsistent values or settings, such as use of a port other than port 80 for web communications. The web page verifier 232 may also scan the web page 226 for code fragments of a virus included in known maliciously modified web pages. The signs indicative of malicious modification may be assigned scores that can be aggregated to generate a likelihood score that may be used to make a determination as to whether the web page 226 has been maliciously modified. For example, the likelihood score may be compared to a threshold.

If the web page verifier 232 deems that the web page 226 has not been maliciously modified, the web page verifier 232 allows the web page 226 to be received by the web browser 212. For example, the web page 226 may point the web browser 212 to the address of the web page 226. When the web page 226 is received by the web browser 212, its embedded verifier integrity code 227 runs and checks the web page verifier 232 for modifications. For example, the verifier integrity code 227 may calculate an integrity value of the web page verifier 232 and compare the calculated integrity value to an expected integrity value of the web page verifier 232. The expected integrity value may be the integrity value of the web page verifier 232 as originally published. Because the web page verifier 232 is not expected to be modified after publication, the verifier integrity code 227 may deem any modification to the web page verifier 232 to be malicious.

Verifying the integrity of the web page 226 using the web page verifier 232 and verifying the integrity of the web page verifier 232 using the verifier integrity code 227 advantageously makes it very difficult for cyber criminals to get away with malicious modification of the web page 226. Not only does the cyber criminal have to locate the web page 226 directly, he or she also has to modify the web page verifier 232 and the verifier integrity code 227. It is preferred to host the verifier 232 in a server separate from the one hosting the web page 226 to make it even more difficult for cyber criminals.

The web page verifier 232 may initiate a security action when it deems the web page 226 to be malicious modified. The security action may involve alerting the user of the client computer 210 or administrator of the server 220, preventing the web page 226 from being received or rendered by the web browser 212, removing the malicious modification from the web page 226, or replacing the web page 226 with another web page warning the user of the tampering of the web page 226. As another example, the web page verifier 232 may remove from the web page 226 any link to the malicious web server 260. In the example of FIG. 2, the "X" on arrow 205 indicates that a connection to the malicious web server 260 does not occur due to the web page verifier 232 detecting the malicious modification and performing appropriate security action.

In the event the web page 226 is deemed to have been maliciously modified, the web page verifier 232 may be configured to report the incident to the incident report server 240 (arrow 206), which in turn may alert the administrator of the web server 220. The incident report server 240 may also alert an antivirus researcher to investigate the incident to come up with precautionary measures or gather information to improve the performance of later published web page verifiers 232. The web page verifier 232 may also be configured to receive antivirus or other cleanup service from the cleanup server 250 (arrow 250) if the web page 226 has been modified with a virus, for example.

Similarly, the verifier integrity code 227 may initiate a security action when it deems the web page verifier 232 to have been compromised. Such a security action may include stopping the web browser 212 from rendering the web page 226 or replacing the web page 226 with another web page warning the user of the tampering of the web page 226.

Figure 3:
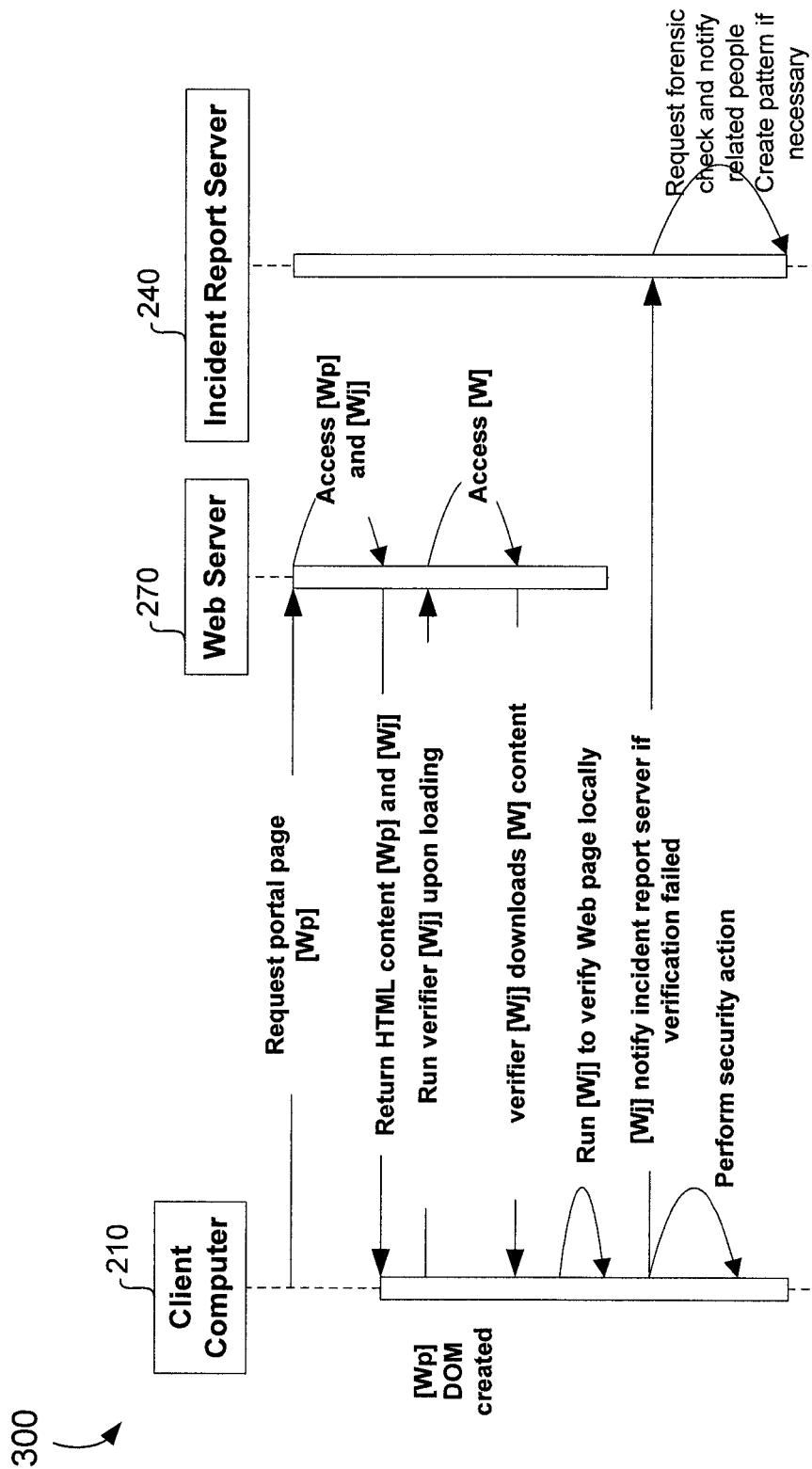
FIGS. 3, 4, and 5 show call diagrams for checking for malicious modifications to web pages in accordance with embodiments of the present invention.
Figure 4:
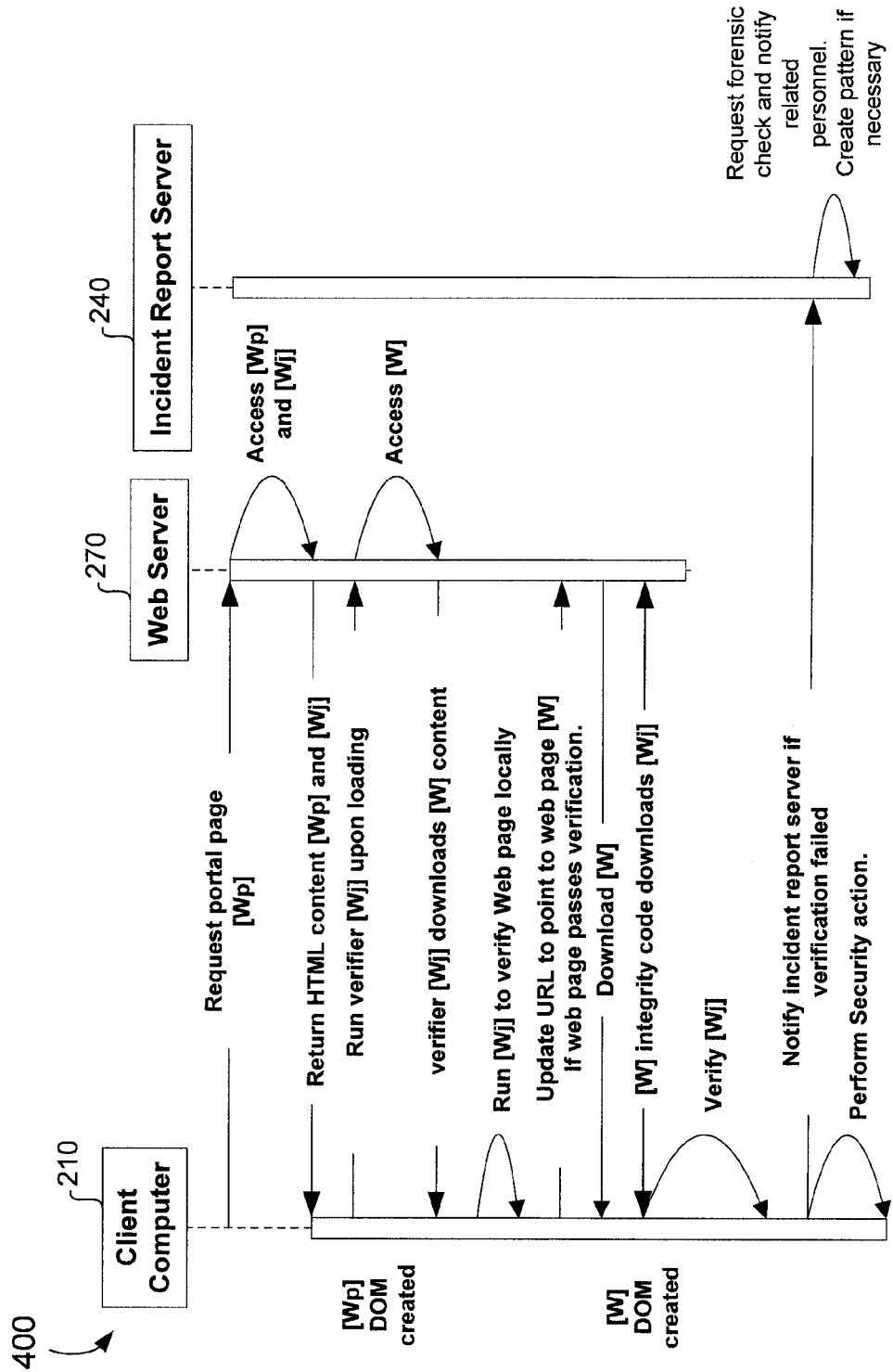
Figure 5:
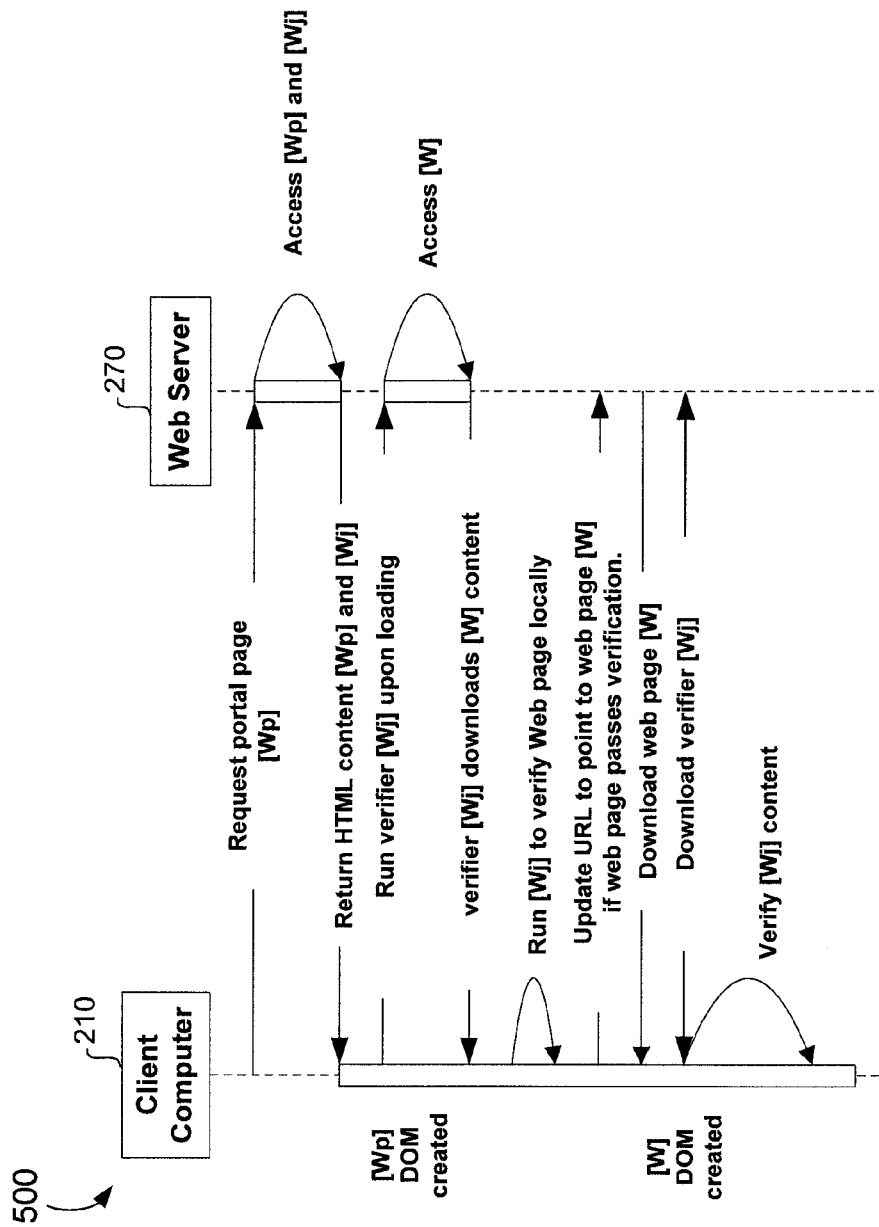

FIGS. 3, 4, and 5 show call diagrams for checking for malicious modifications to web pages in accordance with embodiments of the present invention. The call diagrams of FIGS. 3, 4, and 5 are explained using the system of FIG. 2 for illustration purposes only. In the call diagrams of FIGS. 3, 4, and 5, the web server 270 comprises one or more server computers hosting the web page 226 and corresponding web page verifier 232 and portal page 224.

FIG. 3 shows a call diagram 300 for the case where the web page 226 has been maliciously modified. As shown in FIG. 3, the client computer 210 requests the portal page 224 (also labeled as "[Wp]") from the web server 270. The web server 270 accesses the portal page 224 and the web page verifier 232 (also labeled as "[Wj]") and provides them to the client computer 210. The web browser 212 creates a document object model (DOM) for the portal page 224. The web page verifier 232 runs in the client computer 210 to retrieve the web page 226 (also labeled as "[W]") from the web server 270 and locally (i.e., in the client computer 212) verifies the integrity of the web page 226. If the verification fails, i.e., the web page verifier 232 deems the web page 226 maliciously modified, the web page verifier 232 so informs the incident report server 240 and performs a security action.

FIG. 4 shows a call diagram 400 for the case where the web page 226 passes verification but the web page verifier 232 does not. As in the call diagram 300, the client computer 210 requests the portal page 224 (also labeled as "[Wp]") from the web server 270. The web server 270 accesses the portal page 224 and the web page verifier 232 (also labeled as "[Wj]") and provides them to the client computer 210. The web browser 212 creates a document object model (DOM) for the portal page 224. The web page verifier 232 runs in the client computer 210 to retrieve the web page 226 (also labeled as "[W]") from the web server 270 and locally verifies the integrity of the web page 226.

Still referring to FIG. 4, if the web page 226 passes verification, the web page verifier 232 points the web browser 212 to receive the now verified web page 226. The web browser 212 creates a DOM for the web page 226. The verifier integrity code 227 of the web page 226 runs and downloads a copy of the web page verifier 232 from the web server 270 and stores the copy of the web page verifier 232 in a security buffer memory. The verifier integrity code 227 checks the integrity of the web page verifier 232 by looking for modifications. If the web page verifier 232 does not pass verification, i.e., it has been modified, the verifier integrity code 227 so informs the incident report server 240 and performs a security action.

FIG. 5 shows a call diagram 500 for the case where both the web page 226 and the web page verifier 232 pass verification. As in the call diagram 400, the client computer 210 requests the portal page 224 (also labeled as "[Wp]") from the web server 270. The web server 270 accesses the portal page 224 and the web page verifier 232 (also labeled as "[Wj]") and provides them to the client computer 210. The web browser 212 creates a document object model (DOM) for the portal page 224. The web page verifier 232 runs in the client computer 210 to retrieve the web page 226 (also labeled as "[W]") from the web server 270 and locally verifies the integrity of the web page 226. If the web page 226 passes verification, the web page verifier 232 points the web browser 212 to receive the now verified web page 226. The web browser 212 creates a DOM for the web page 226. The verifier integrity code 227 of the web page 226 runs and downloads a copy of the web page verifier 232 from the web server 270 and stores the copy of the web page verifier 232 in a security buffer memory. The verifier integrity code 227 checks the integrity of the web page verifier 232 by looking for modifications. The call diagram 500 ends when the web page verifier 232 passes verification, i.e., not modified.

Figure 6:
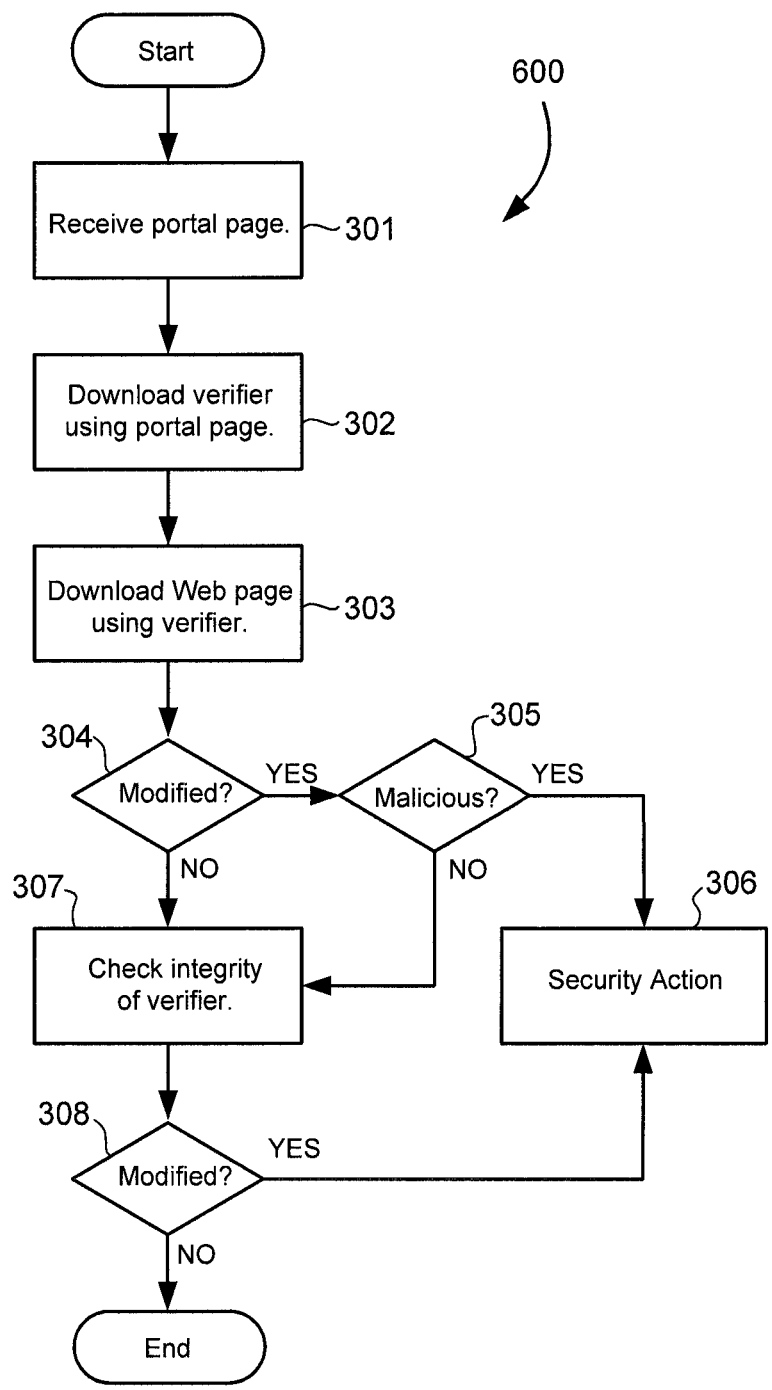
FIG. 6 shows a flow diagram of a method of checking for malicious modifications to web pages in accordance with an embodiment of the present invention.

Referring now to FIG. 6, there is shown a flow diagram of a method 600 of checking for malicious modifications to web pages in accordance with an embodiment of the present invention. The method 600 is explained using the system of FIG. 2 for illustration purposes only. The method 600 may be performed in the client computer 210.

In the example of FIG. 6, the portal page 224 is received in the client computer 210 (step 301). The portal page 224 runs and downloads the web page verifier 232 into the client computer 210 (step 302). The web page verifier 232 runs and downloads a copy of the web page 226 (step 303). The web page verifier 232 checks the web page 226 for any modification (step 304). If the web page 226 is modified (step 304 to step 305) and the modification is malicious in nature (step 305 to step 306), the web page verifier 232 initiates a security action. Otherwise, the verifier integrity code 227 of the web page 226 runs in the client computer 210 to verify the integrity of the web page verifier 232 (step 307). The verifier integrity code 227 initiates a security action if the verifier integrity code 227 finds that the web page verifier 232 has been modified (step 307 to step 308 to step 306).

Figure 7:
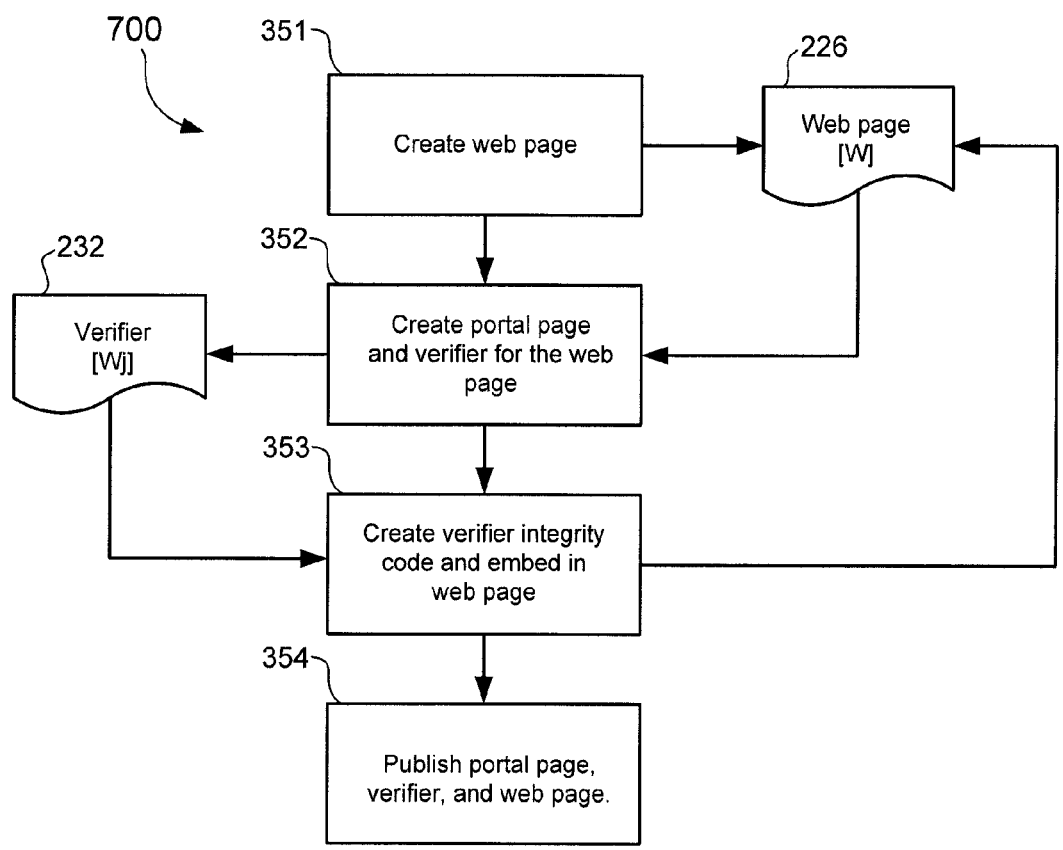
FIG. 7 schematically shows a flow diagram of a method of preparing a web page and corresponding portal page and web page verifier in accordance with an embodiment of the present invention.

FIG. 7 schematically shows a flow diagram of a method 700 of preparing a web page and corresponding portal page and web page verifier in accordance with an embodiment of the present invention.

In the example of FIG. 7, a web designer creates a web page 226 (step 351). A web page verifier 232 and a portal page are then created for the web page 226 (step 352). The web page verifier 232 may be created manually by a software engineer or automatically using a script, for example. The script may create the web page verifier 232 from a template that includes general program code for detecting signs indicative of malicious modifications and for initiating security actions. The script may calculate the integrity value of the web page 226 to generate an expected integrity value, and customize the template with the expected integrity value. The customized template may be published as the web page verifier 232.

The portal page 224 may be created from a template that is manually or automatically filled with the address (e.g., uniform resource locator or URL) of the web page verifier 232. The template may include program code for retrieving the web page verifier 232 using its URL.

The verifier integrity code 227 may be created and then embedded in the web page 226 (step 353). The verifier integrity code 227 may be created manually by a software engineer or automatically using a script, for example. The script may create the verifier integrity code 232 from a template that includes general program code for initiating security actions. The script may calculate the integrity value of the web page verifier 232 to generate an expected integrity value, and customize the template with the expected integrity value to create the verifier integrity code 227. The script may embed the verifier integrity code 227 into the web page 226. The portal page 224, the web page verifier 232, and the web page 226 are published thereafter (step 354).

Figure 8:
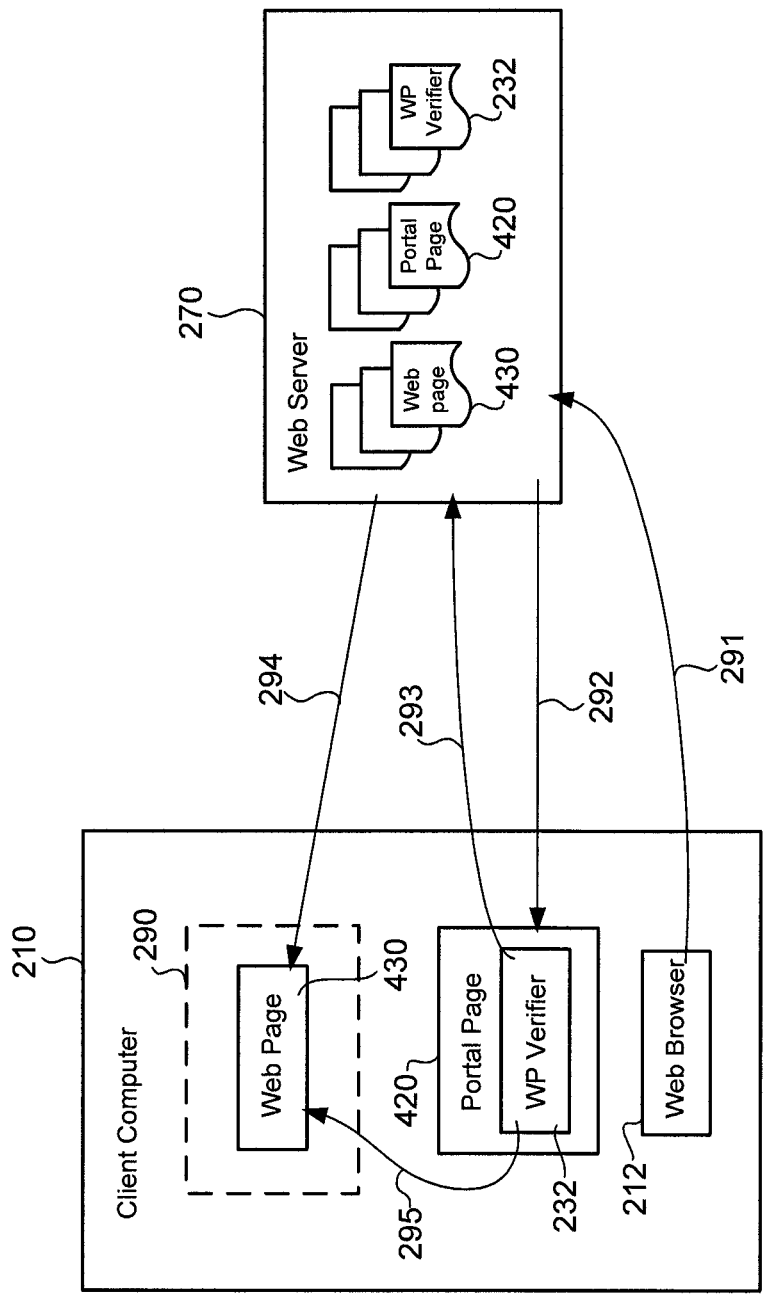
FIG. 8 schematically shows a system for checking for malicious modifications to web pages in accordance with an embodiment of the present invention.

FIG. 8 schematically shows a system for checking for malicious modifications to web pages in accordance with an embodiment of the present invention. In the example of FIG. 8, the web server 270 hosts a website having a plurality of web pages 430, with each web page 430 having a corresponding portal page 420 and web page verifier 232. A portal page 420 is the same as the previously described portal page 224 except that it has an embedded verifier 232. The web page 430 comprises a conventional web page and does not necessarily include a verifier integrity code 227.

Referring to FIG. 8, the web browser 212 requests to receive a portal page 420 of a web page 226 (arrow 291). In response, the web server 270 provides the portal page 420 to the client computer 210 (arrow 292). The portal page 420, with the web page verifier 232, is received in the client computer 210. The web page verifier 232 runs in the client computer 210 and requests (arrow 293) and downloads the web page 430 into a security buffer memory 290 for verification (arrow 294). Once in the client computer 210, the web page verifier 232 can perform various operations on the web page 430 (arrow 295), including checking the web page 430 for malicious modifications.

Figure 9:
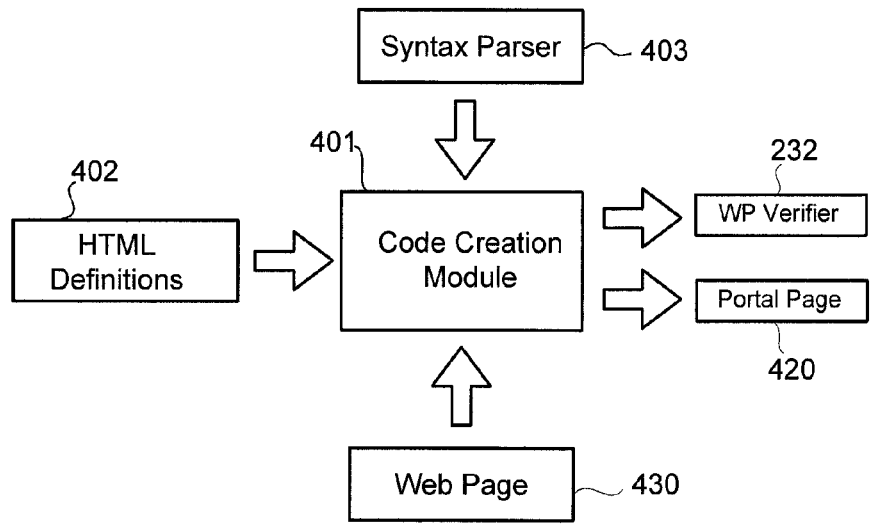
FIG. 9 schematically shows a code creation module in accordance with an embodiment of the present invention.

FIG. 9 schematically shows a code creation module 401 in accordance with an embodiment of the present invention. The code creation module 401 may be used to dynamically create portal pages and web page verifiers.

The code creation module 401 may comprise computer-readable program code for generating a web page verifier 232 and a portal page 420. In the example of FIG. 9, the code creation module 401 parses the content of a web page 430 using a syntax parser 403. As explained with reference to FIG. 8, the web page 430 may comprise a conventional web page written in HTML, and does not necessarily include a verifier integrity code 227.

The HTML definitions 402 may comprise HTML code for identifying HTML code indicative of a malicious modification. For example the HTML definitions 402 may comprise program code for detecting HTML tags for patterns likely to be due to malicious modifications, IP addresses of known malicious web servers, inconsistent values or settings, code fragments of a virus included in known maliciously modified web pages, and so on. The code creation module 401 may include the HTML definitions 402 in a template for a web page verifier 232. The code creation module 401 may calculate the integrity value of the web page 430 and insert the calculated integrity value in the template for the web page verifier 232.

The code creation module 401 may also generate the portal page 420 from a template that includes program code for retrieving the web page verifier 232. The code creation module 401 may embed the web page verifier 232 in the portal page 420.

Figure 10:
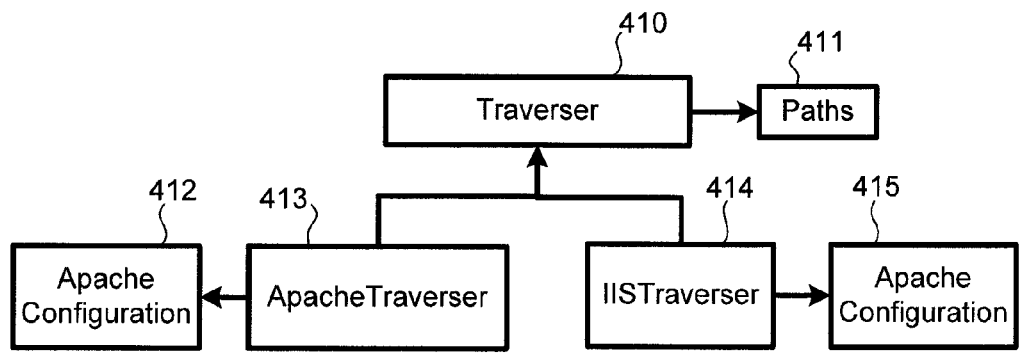
FIG. 10 schematically shows a traverser in accordance with an embodiment of the present invention.

FIG. 10 schematically shows a traverser 410 in accordance with an embodiment of the present invention. The traverser 410 may comprise computer-readable program code for determining the locations of web pages. In the example of FIG. 10, the traverser 410 may utilize an apache traverser 413 for traversing Apache HTTP servers and an IIS traverser 414 for traversing Internet Information Servers (IIS). The traversers 413 and 414 may gather the paths to locations of web pages from Apache configurations 412 and 415, respectively. The traverser 410 receives the paths of web pages in a server, either an Apache HTTP server or IIS server in this example, and generates corresponding paths 411. The paths 411 contain the locations of web pages in a server, and may be used by the code creation module 401 to generate corresponding portal pages 420 and web page verifiers 232. As can be appreciated, the paths 411 may also be manually generated and provided to the code creation module 401 or other modules.

Figure 11:
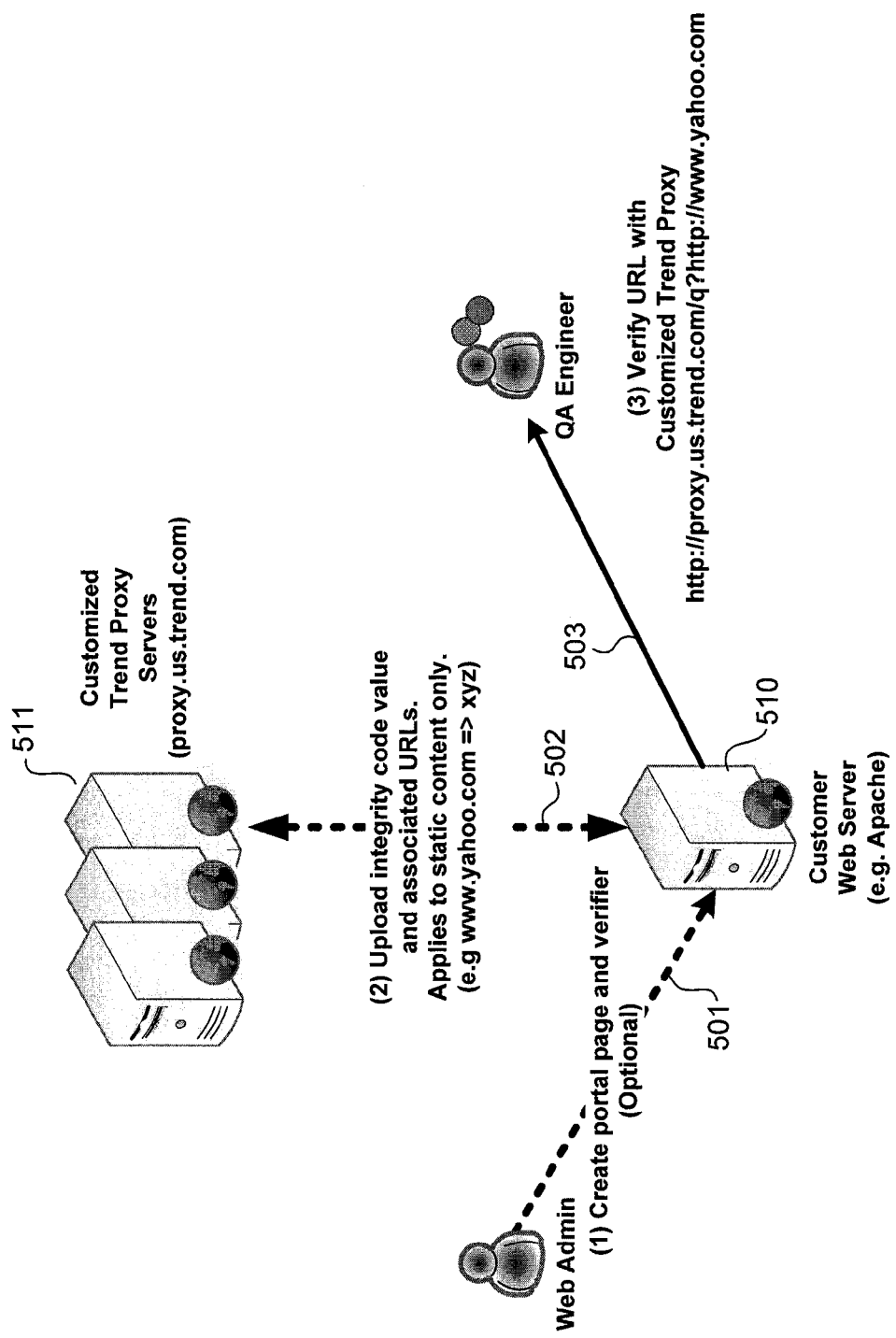
FIGS. 11-13 show a flow diagram schematically illustrating operation of a system for checking for malicious modifications to web pages in accordance with an embodiment of the present invention.
Figure 12:
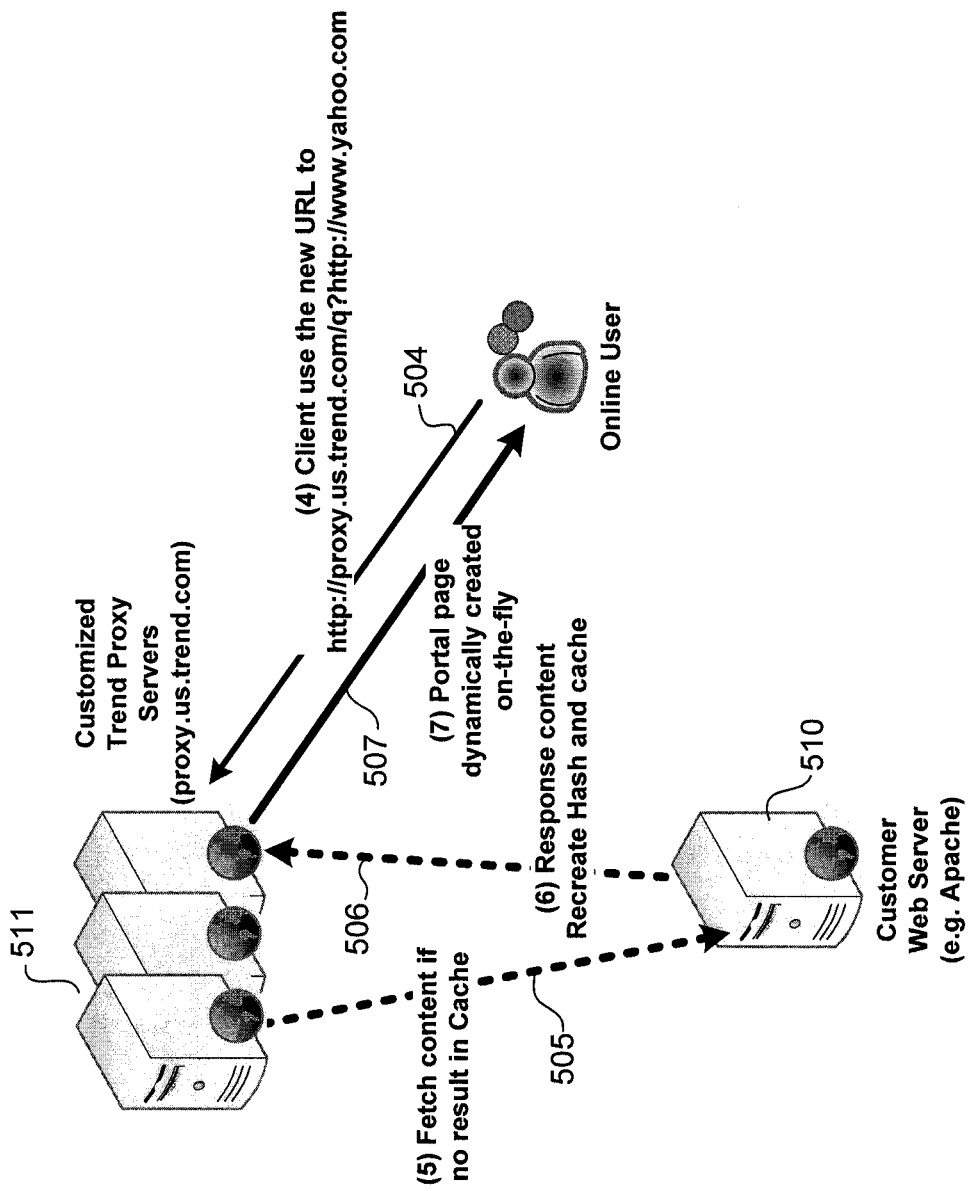
Figure 13:
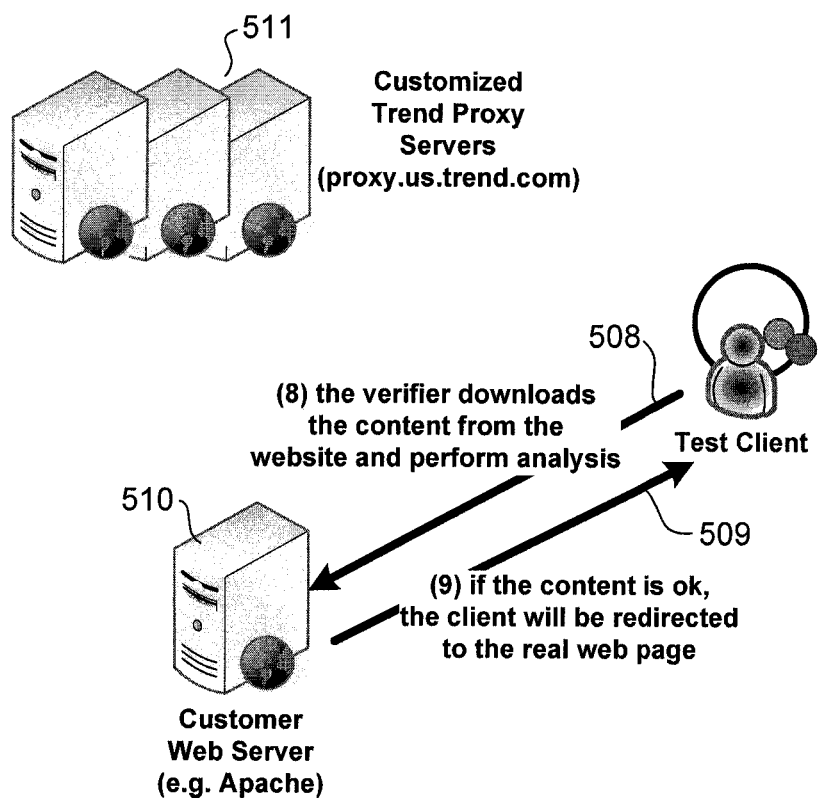

FIGS. 11-13 show a flow diagram schematically illustrating operation of a system for checking for malicious modifications to web pages in accordance with an embodiment of the present invention. The embodiment of FIGS. 11-13 illustrates an approach that uses a proxy server to dynamically create and serve portal pages and web page verifiers.

Beginning in FIG. 11, a web administrator or other authorized personnel may optionally create a portal page and web page verifier for each web page hosted by the customer web server 510 (arrow 501). Alternatively, the customer may instead use the services of the proxy servers 511. The following sequence assumes that the customer pays for the services of a security vendor (Trend Micro, Inc. in this example) to provide the proxy servers 511. The customer in this example is "yahoo.com" for illustration purposes only.

In the proxy server scenario, the customer calculates the integrity values of the web pages hosted in the customer server 510 and provides the integrity values along with the URLs of the web pages to the security vendor (arrow 502). The proxy servers 511 are then configured to proxy for the customer web server 510. That is, requests to access web pages in the web server 510 are serviced by the proxy servers 511. This may be performed by publishing locations in the proxy servers 411 for web pages in the customer web server 510. A quality assurance engineer verifies the proxy operation (arrow 503).

Referring to FIG. 12, an online user on a client computer requests to access a web page hosted in the customer web server 510 by way of the proxy servers 511 (arrow 504). If the online user is requesting a web page that has not been cached in the proxy servers 511, the proxy servers 511 retrieves the requested web page from the customer web server 510 (arrow 505). In response, the customer web server 510 provides the requested web page to the proxy servers 511 (arrow 506). The proxy servers 511 update their cache to reflect that they locally have the requested web page. The proxy servers 511 dynamically create a portal page and web page verifier for the requested web page. The web page verifier is embedded in the portal page in this example. The proxy servers 511 provide the portal page to the online user's client computer (arrow 507).

Referring to FIG. 13, the portal page is received in the online user's client computer. There, the web page verifier embedded in the portal page downloads the requested web page from the customer web server 510. The web page verifier stores the requested web page in a security buffer memory for verification. If the web page verifier deems that the requested web page has not been maliciously modified, the web page verifier redirects the user's web browser to the location of the requested web page in the customer web server 510 (arrow 509). The web page verifier may be configured to perform a security action if it deems the web page to have been modified.

Figure 14:
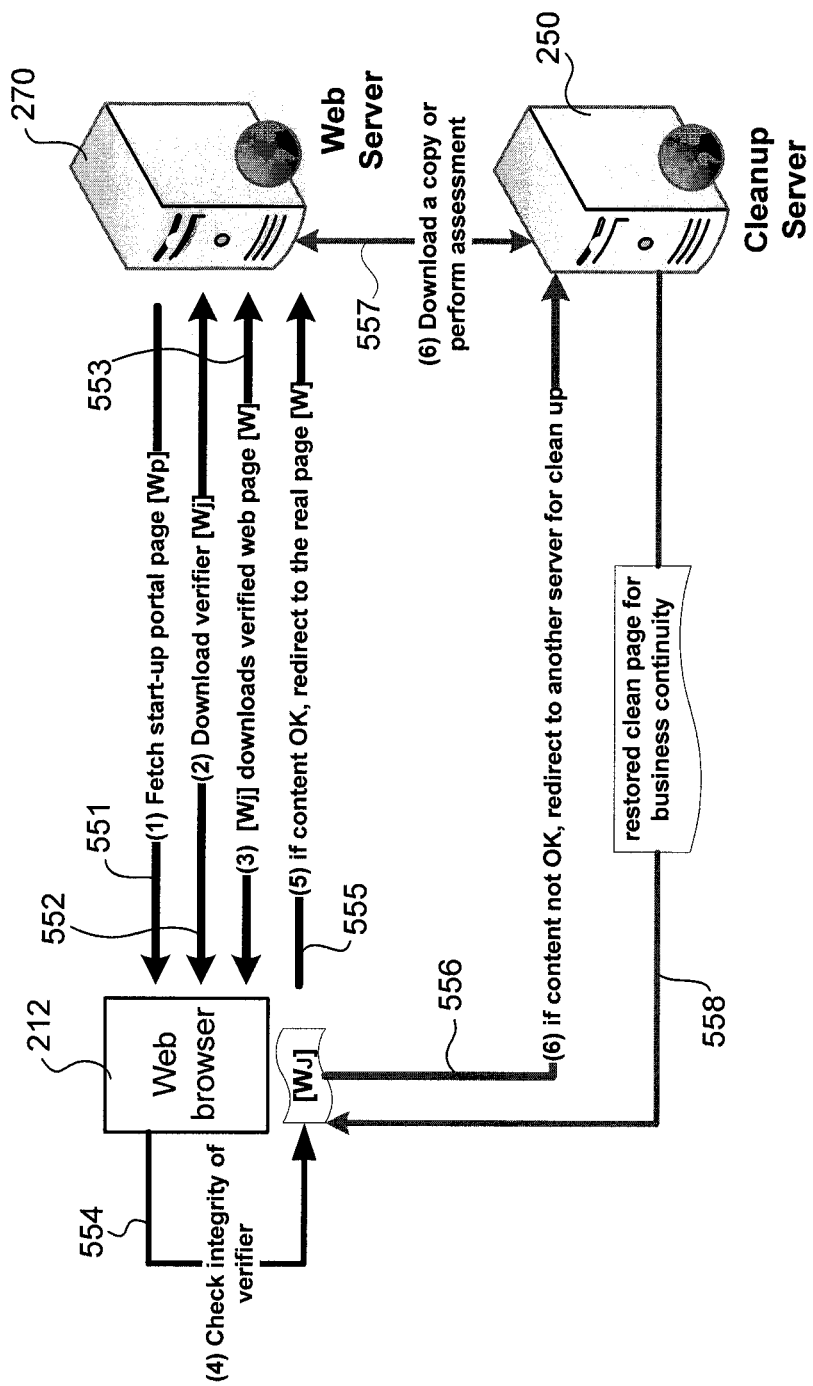
FIG. 14 shows a flow diagram schematically illustrating operation of a system for checking for malicious modifications to web pages in accordance with an embodiment of the present invention.

FIG. 14 shows a flow diagram schematically illustrating operation of a system for checking for malicious modifications to web pages in accordance with an embodiment of the present invention. The embodiment of FIG. 14 illustrates an approach where the cleanup server 250 allows for continued business operation despite malicious web page modifications.

In the example of FIG. 14, the web browser 212 running in a client computer receives a portal page from the web server 270 (arrow 551). The portal page loads in the client computer and downloads the web page verifier from the web server 270 (arrow 552). The web page verifier loads in the client computer, and downloads and verifies the web page. Assuming the web page passes verification, the web page verifier downloads the verified web page for loading by the web browser 212 (arrow 553). The verified web page loads in the client computer and runs its embedded verifier integrity code to verify the web page verifier (arrow 554).

In the above example, the web browser is redirected to the address of the real web page when the web page and the web page verifier pass verification (arrow 505). In the event the web page or the web page verifier does not pass verification, the client computer 210 may be redirected to the cleanup server 250 (arrow 556). The user of the client computer may report the incident to the clean up server 250, which may then obtain a copy of the maliciously modified web page or perform an assessment (arrow 557). The cleanup server 250 may try to cleanup a maliciously modified web page using conventional antivirus algorithms and provide a clean copy of the modified web page if successful (arrow 558). Alternatively, the cleanup server 250 may maintain backup clean copies of web pages of the web server 270. In that case, the cleanup server 250 may provide a backup clean copy to the client computer. In any event, the cleanup server 250 may be configured to alert necessary personnel to address the malicious modification of the web page.

Figure 15:
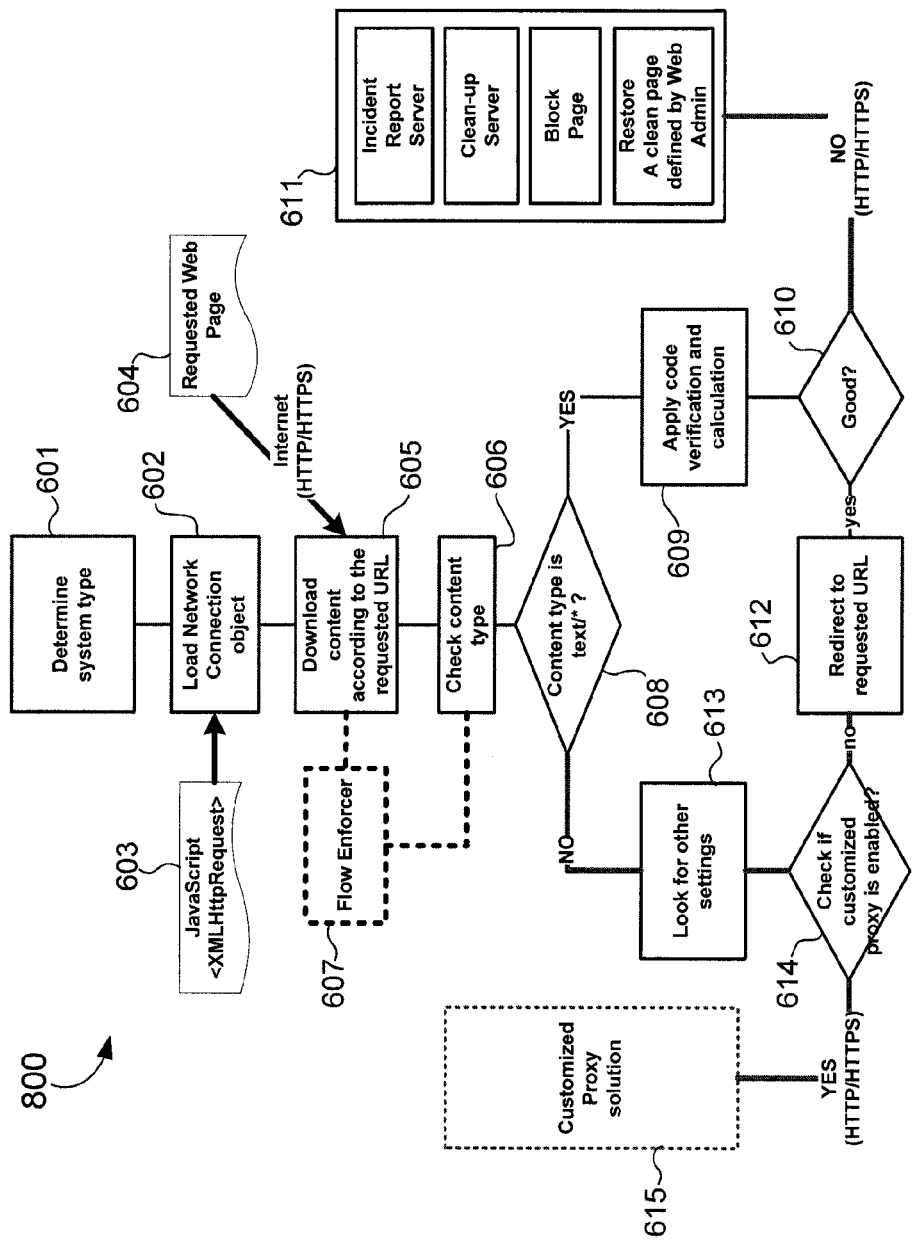
FIG. 15 schematically shows a method of verifying integrity of a web page in accordance with an embodiment of the present invention.

FIG. 15 schematically shows a method 800 of verifying integrity of a web page in accordance with an embodiment of the present invention. The method 800 may be performed by a web page verifier, for example.

In the example of FIG. 15, the web page verifier determines the type of the client computer in which it is loaded (step 601). For example, the web page verifier may only run on a particular operating system or have different code sections for different web browsers. The web page verifier loads network connection objects to communicate over the computer network (step 602). The web page verifier may include Java script for making HTTP requests (see 603). The web page verifier receives the web page (see 604) over the Internet (step 605). A flow enforcer ensures that the user starts at a portal page by, for example, using cookies or session information (see 607). The web page verifier checks the content type of the web page (step 606). The content type may be text or binary, for example. If the content of the web page is in text, the web page verifier calculates the integrity value of the web page for comparison to its expected integrity value and, if the integrity values do not match, checks the web page for signs of malicious modifications (step 608 to step 609). If the web page verifier deems the web page to be have been maliciously modified, the web page verifier initiates a security action, which may include reporting to an incident report server, redirection to a cleanup server, blocking the web page, replacing the web page with a clean copy, and so on (step 610 to step 611). Otherwise, the web page verifier redirects the client web browser to the real web page (step 610 to step 612).

If the content type of the web page is other than text (e.g., binary) and the web page verifier is not configured to analyze non-text content, the web page verifier checks its other settings (step 613), such as whether it is operating in a proxy configuration where it can request another server to perform virus scanning or web page analysis. In that case, the web page verifier may forward the web page or its URL to the other server for analysis (step 614 to step 615). Otherwise, the web page verifier may simply deem the web page to be good and redirect the client browser to the real web page (step 614 to step 612).

Methods and systems for checking web pages for malicious modifications have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of checking for malicious modifications to web pages, the method comprising:

creating a corresponding web page verifier and portal page for a web page before the web page is provided to a client computer, the portal page including an address of the web page verifier before the portal page is provided to the client computer;

providing the portal page to the client computer in response to a request from a web browser running in the client computer;

retrieving the web page verifier into the client computer by using the address of the web page verifier as indicated in the portal page;

using the web page verifier to download the web page to the client computer;

in the client computer, verifying integrity of the web page by checking the web page for a malicious modification using the web page verifier;

when the web page is deemed by the web page verifier as not having been modified or as having been modified but not maliciously, verifying integrity of the web page verifier by checking the web page verifier for modification; and performing a security action when the web page is deemed by the web page verifier as having been maliciously modified.

2. The method of claim 1 wherein the integrity of the web page verifier is verified using computer-readable program code embedded in the web page.

3. The method of claim 1 wherein the web page verifier is hosted in a server separate from a web server hosting the portal page.

4. The method of claim 1 wherein the security action comprises replacing the web page with a backup web page from another server.

5. The method of claim 1 wherein the security action comprises reporting to an incident report server.

6. The method of claim 1 wherein the malicious modification includes redirection to a malicious server computer.

7. A system for checking for malicious modifications to a web page, the system comprising:

a first server computer configured to serve a portal page to a client computer, the portal page being configured to load a web page verifier in the client computer using an address of the web page verifier that is embedded in the portal page prior to the portal page being provided to the client computer; and a second server computer configured to provide the web page verifier to the client computer upon request by the portal page, the web page verifier being configured to download a web page to the client computer and verify integrity of the web page in the client computer, the web page verifier being configured to perform a security action when it deems the web page as having been maliciously modified, the web page including a verifier integrity code configured to verify integrity of the web page verifier when the web page verifier deems the web page as not having been modified or as having been modified but not maliciously;

wherein the web page verifier as stored in the second server computer and before being provided to the client computer includes computer-readable program code for pointing a web browser of the client computer to receive the web page in the client computer.

8. The system of claim 7 further comprising:

a third server computer configured to receive an incident report from the web page verifier when the web page is deemed by the web page verifier to have been malicious modified.

9. The system of claim 7 wherein the malicious modifications include redirection to a malicious server computer.

10. A method of checking for malicious modifications to web pages, the method comprising:

providing a first web page to a client computer, the first web page including an address of a web page verifier before the web page verifier is provided to the client computer;

downloading the web page verifier to the client computer using the address of the web page verifier included in the first web page;

using the web page verifier to download a second web page to the client computer, the web page verifier including computer-readable program code that exists in the web page verifier before the web page verifier is received in the client computer for pointing a web browser of the client computer to receive the second web page in the client computer;

verifying an integrity of the second web page in the client computer by checking the second web page for a malicious modification using the web page verifier;

verifying integrity of the web page verifier when the web page verifier deems the second web page as not having been modified or as having been modified but not maliciously; and performing a security action when the web page verifier deems the second web page as having been maliciously modified.

11. The method of claim 10 wherein the malicious modification includes redirection to a malicious server computer.

12. The method of claim 10 wherein the first web page and the web page verifier are hosted in different server computers.

13. The method of claim 10 wherein the security action includes reporting to an incident server.

14. The method of claim 10 wherein the security action includes replacing the second web page.

15. The method of claim 10 wherein the first and second web pages are hosted in the same server computer.

* * * * *